United States Patent [19]
Keller

[11] 3,733,090
[45] May 15, 1973

[54] ANTI-JACKKNIFING ASSEMBLY
[76] Inventor: Anthony T. Keller, 10 Hilton Drive, West Haven, Conn.
[22] Filed: Apr. 9, 1971
[21] Appl. No.: 132,794

[52] U.S. Cl. ............................................. 280/432
[51] Int. Cl. ........................................... B62d 53/08
[58] Field of Search ................................. 280/432

[56] References Cited
UNITED STATES PATENTS

| | | | |
|---|---|---|---|
| 2,959,429 | 11/1960 | Lavelle | 280/432 |
| 3,031,205 | 4/1962 | Fox | 280/432 |
| 3,556,559 | 1/1971 | Interisano | 280/432 |
| 2,773,702 | 12/1956 | Safko | 280/432 |
| 2,454,626 | 11/1948 | Borzell | 280/432 |
| 3,136,566 | 6/1964 | Harding | 280/432 X |

Primary Examiner—Leo Friaglia
Attorney—Delio & Montgomery

[57] ABSTRACT

This disclosure relates to apparatus for use in combination with a towing vehicle and a towed vehicle pivotally connected in tandem thereto. Carried on the so-called fifth wheel of the towing or tractor are retractable members which may be extended into a position in which they will engage stopping blocks defined in opposite ends of arcuate paths defined on the towed vehicle or trailer.

6 Claims, 5 Drawing Figures

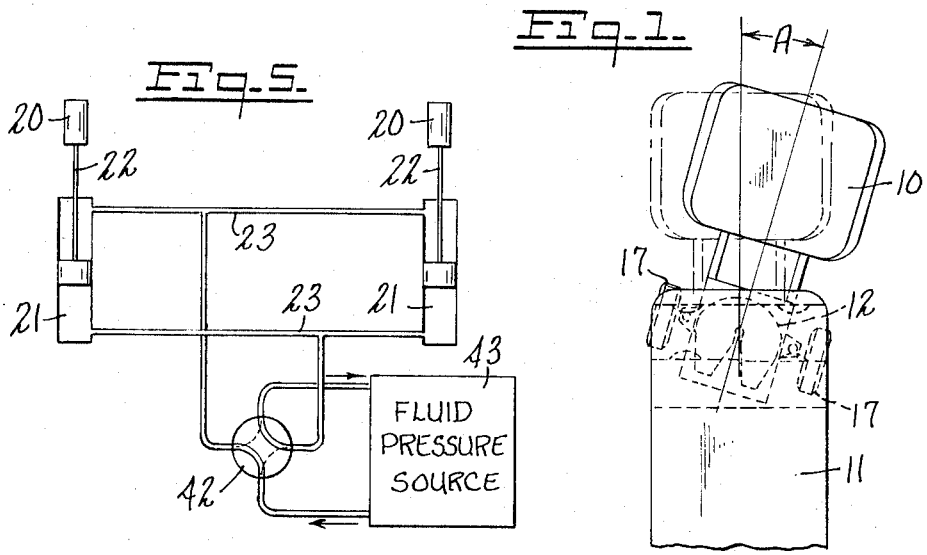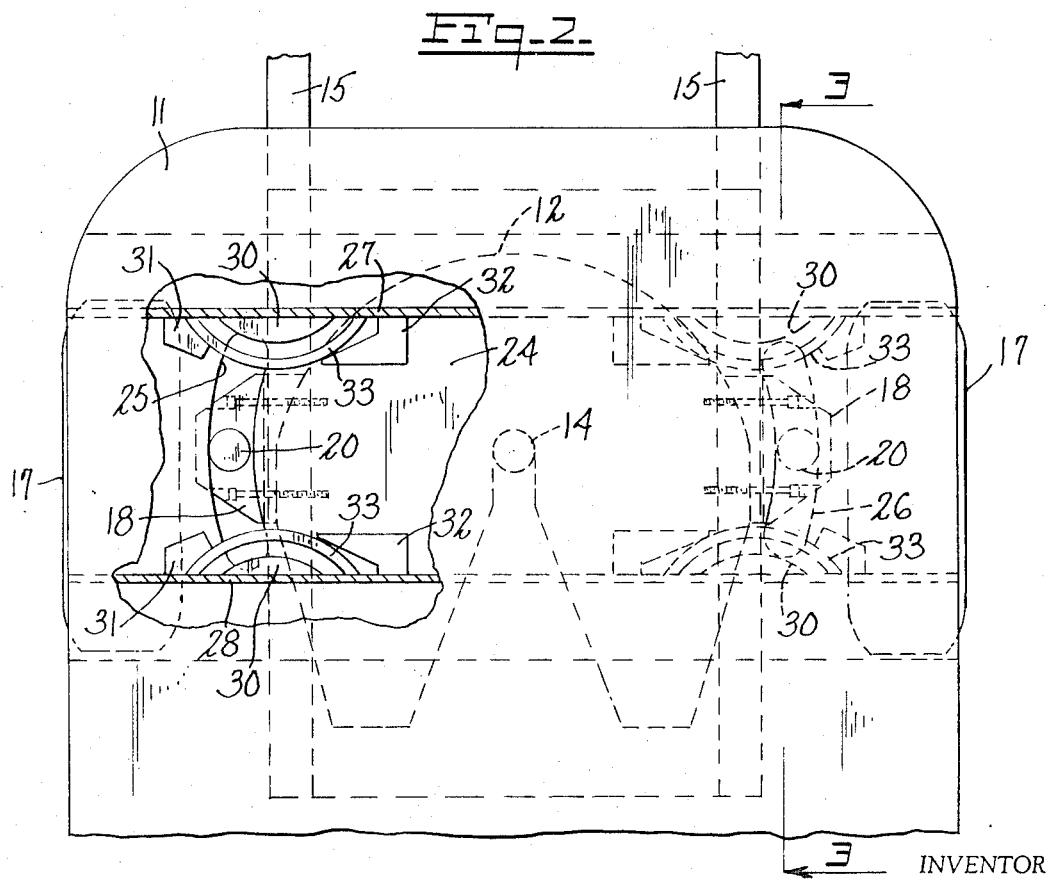

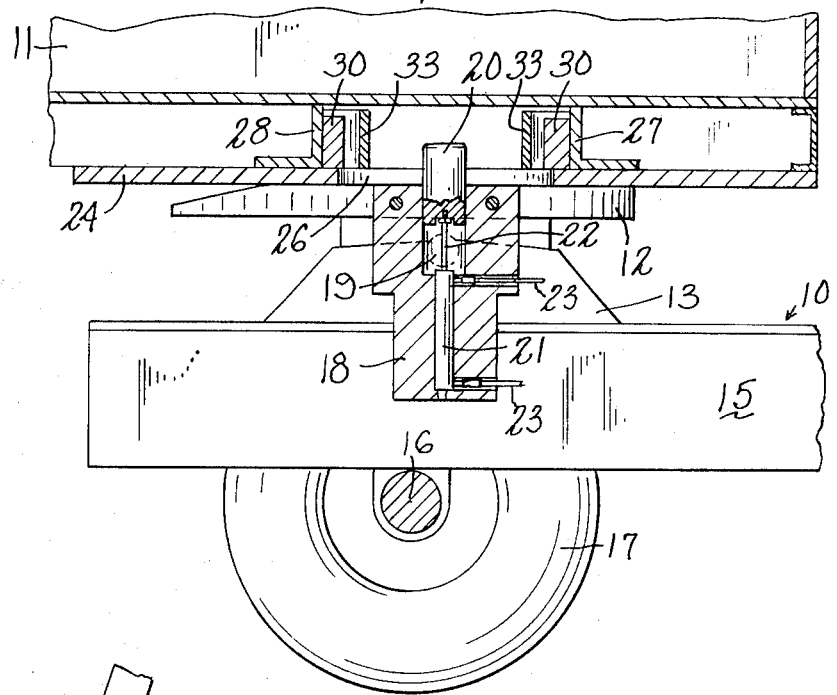
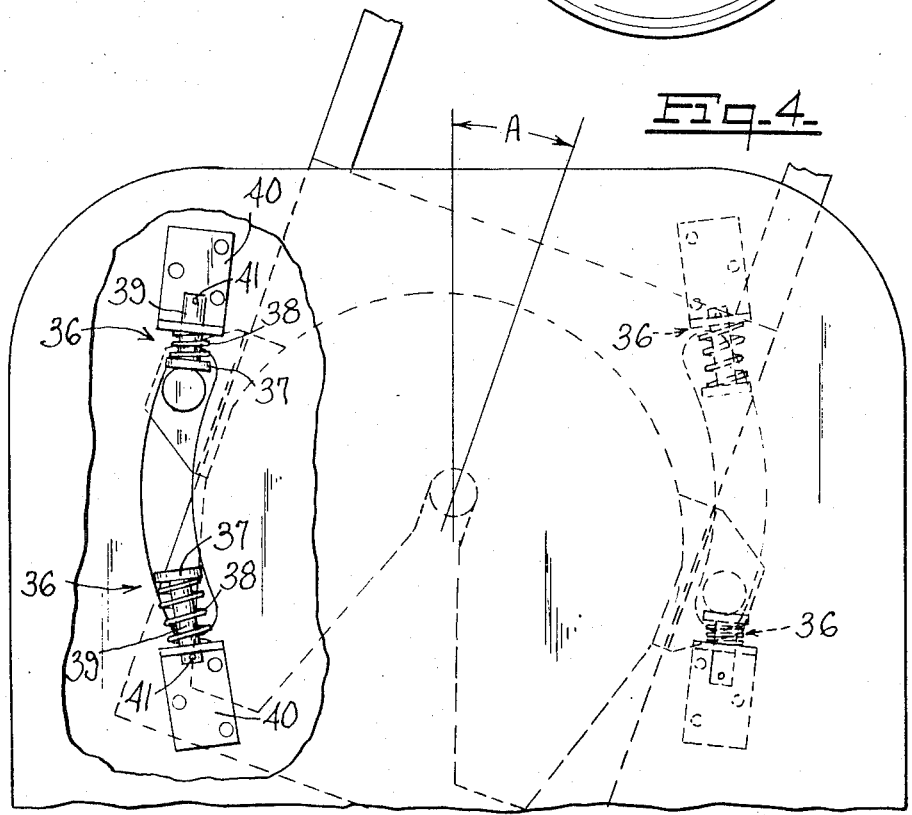

ANTI-JACKKNIFING ASSEMBLY

This invention relates to an assembly for limiting the extent to which two vehicles pivotally connected in tandem can pivot relative to each other, and more particularly relates to an assembly for preventing jackknifing of two vehicles pivotally connected in tandem.

The hazards of jackknifing, that is, the angular dislocation between two vehicles coupled together is quite often encountered, especially on high-speed highways. This angular dislocation is often abrupt and totally unexpected and is frequently accompanied by the overturning of one or both of the tractor and trailer.

Jackknifing is caused primarily by an abrupt turn, skid, or sway of the towed or towing vehicles such that the momentum of the towed vehicle is in a direction different from the towing vehicle, with the result that one or both of the vehicles are thrown off the line of travel and a sideways skid of one or both vehicles results.

Various arrangements have been proposed to prevent or minimize tendencies for vehicles to jackknife. Previous proposals have usually been based on some positive-connecting means between the towing and towed vehicles whereby an auxiliary connection is achieved. Such devices are inconvenient in use and may be time-consuming in the making of connections between the vehicles. Simpler stop-block mechanisms have also been proposed not requiring an additional connection between the vehicle; however, such devices have not met with favor because of the excessive repairs and non-adjustability, particularly when it is desired to increase the permissible angle of the vehicles relative to each other for low-speed maneuvering, parking and docking. Moreover, simple stop block devices heretofore known have not been capable of dissipating forces of contact and have either failed to prevent jackknifing or cause bending, rupture or other damage to adjacent parts of the vehicles due to the great stresses involved.

Pending application, Ser. No. 39,062 (DeLio and Montgomery Docket No. 8825) filed on the same date as this application and now abandoned discloses an anti-jackknifing arrangement which has been successfully tested to limit the relative angle at which the towed and towing vehicles may be turned with respect to each other, and further provides retractable bumpers which may be moved out of engagement so as to permit greater angular disposition of the two vehicles for coupling, low speed maneuvering, docking, etc.

The present invention also provides a construction which provides the advantages primarily adapted for use on tractor-trailer rigs wherein the trailer is partially supported on the tractor and coupled thereto as by means of a so-called fifth wheel. The fifth wheel is a disc-like member which receives the weight of the forward end of the trailer and which also receives a pin connection centrally thereof which connects the tractor to the trailer.

Briefly stated, the invention in one form thereof comprises retractable members which are carried in housings affixed to essentially diametrically opposed positions on the tractor fifth wheel, and may be extended beyond the plane of the surface of the fifth wheel on the tractor and retracted therefrom. Cooperating means are provided on the trailer in a form of stopping blocks at either ends of arcuate paths which define the maximum pivotal angular relationship of the tractor and trailer when the means are extended. This assembly upon disconnection will provide no limitation upon pivotal angular relationship of the tractor and trailer when placed in an inoperative position. When enabled any jackknifing tendency is reacted at points spaced equally from the point of connection of the tractor and trailer.

An object of this invention is to provide a new and improved anti-jackknifing assembly for tractor-trailer rigs.

Another object of this invention is to provide a new and improved anti-jackknifing device which is a simple and compact arrangement and may be easily disabled and enabled.

A further object of this invention is to provide a new and improved anti-jackknifing assembly for a tractor-trailer rig where the jackknifing tendency is reacted at points equally spaced on opposite sides of the connecting point between the tractor and trailer.

The features of the invention which are believed to be novel are particularly pointed out and distinctly claimed in the concluding portion of this specification. However, the invention both as to its organization and operation, together with further objects and advantages thereof, may best be appreciated by reference to the following detailed description taken in conjunction with the drawings, wherein:

FIG. 1 is a view of a tractor and portion of a trailer seen from above;

FIG. 2 is the view of the floor or base of the trailer partly cut away;

FIG. 3 is a view as seen in the plane of lines 3—3 of FIG. 2;

FIG. 4 is a view similar to FIG. 2 showing an alternate embodiment of the invention; and FIG. 5 is a fluid diagram schematic showing the arrangement for operating the mechanism.

As shown in FIG. 1, the apparatus embodying the invention is arranged, when in an operative position, to limit the relative pivotal motion between a tractor 10 and a trailer 11 connected thereto at angle A. The trailer 11 is connected to tractor 10 and partially supported thereon through a fifth wheel 12 carried by the tractor. The fifth wheel 12, as shown in FIG. 3, is carried on a base or platform 13 which is, in turn, carried on tractor 10. The fifth wheel 12 is pivotal about a horizontal axis defined by a pin (not shown) carried by platform 13, to facilitate coupling. A vertical pin carried by the trailer (not shown) is received in a socket 14 therefor in the fifth wheel.

The tractor 10 comprises a pair of side frames 15 which carry the platform 13 for the fifth wheel 12. As shown in FIG. 3 the tractor 10 further includes an axle 16 to which is mounted the rear wheels 17.

Coupled to the fifth wheel 12 at either side thereof is a housing member 18 which carries or defines therein a cylindrical cavity 19 which receives a large plunger 20. The upper surface of housing 18 is flush with or slightly below the surface of fifth wheel 12. The plunger 20 is arranged to extend above the upper surface of housing 18 and fifth wheel 12 by a predetermined distance as shown in FIG. 3. In an inoperative position, plunger 20 will be retracted. Further carried in each of housing members 18 is a cylinder 21, the piston rod 22 of which is coupled to plunger 20. Fluid lines 23 extend from cylinder 21 to a control as hereinafter described.

A plate 24 which may form part of the underframe of trailer 11 may be an additional member, or may be integral with the trailer hitch mating with the tractor fifth wheel. Plate 24 engages and rests on fifth wheel 12. A pin (not shown) extends therefrom into the socket 14 in base 13 to complete the drawing connection.

Defined in member 24 are arcuate slots 25 and 26 of predetermined length and radii with respect to the center pin in socket 14. Forward and rear reinforcing members 27 and 28 are disposed at either ends of arcuate slots 25 and 26. Carried by each of the members 27 and 28 at either side thereof are bumpers or stopping blocks 30 together with spring retainers 31 and 32 on either side thereof and defining a housing for a leaf-type spring 33. With this construction, if the plunger 20 engages a spring 33 the rate of application of the force at which the trailer turns with respect to the tractor 10 will be controlled and slowed until the spring 33 bottoms on stop block 30. This prevents a sudden shock or jolt if plungers 20 were allowed to initially engage the blocks 30.

An alternate embodiment of the invention is shown in FIG. 4 wherein a different form of rate controlling spring is used. A bumper 36 having a head portion 37 thereon and a stiff spring 38 about a shaft or rod portion 39 is carried by support members 40 affixed to base 24. Pins 41 received through rods 39 limit outward travel of the bumper under the influence of springs 38. The bumpers 36 extend past the ends of the slots and the bottoming position of the springs 38 define the angle A.

With this arrangement, when the limiting angle A is reached the force is reacted equally but at opposite sides of the center pin to provide a reactive couple.

During low speed maneuvering, docking, coupling or to make sharp turns in city traffic, etc., plungers 20 are retracted. As shown in FIG. 5 a two-way valve 42 may alternately apply pressure to one side of the cylinders 21 and allow the other sides to bleed to a fluid pressure source 43. The fluid control system shown in FIG. 5 may either be hydraulically or pneumatically operated to extend or retract the plungers 20, and may operate off of the existing air reservoir or hydraulic system. The control valve 42 is conveniently located in the operator's cab.

When the plungers 20 are retracted, there is no limitation on the relative angular position of the tractor 10 and the trailer 11.

The apparatus may be arranged to limit the angle A to any value. However, it is preferred that it be no more than 15° – 20°. This angle will usually accommodate most turns while the vehicle is operating at moderate or high speed. The angle selected, however, may be in accordance with the dimensions and characteristics of the vehicles to which the apparatus is applied.

The disclosed arrangement comprises a compact, easily installed, anti-jackknifing device in which the control may be mounted in the cab of the vehicle and the operator may at any time render the anti-jackknifing device operative or inoperative. There is no direct or permanent connection between the tractor and trailer.

It will thus be seen that the objects of the invention set forth above, as well as those made apparent from the preceding description, are efficiently attained. Since changes may be made in the constructions set forth without departing from the spirit and scope of the invention, it is intended that all matter contained in the above description and shown in the accompanying drawings shall be interpreted as illustrative and not in a limiting sense.

What is claimed is:

1. In combination with a tractor and trailer where the trailer is partially supported on the surface of a plate-like member carried by said tractor and has a pivotal connection to the tractor intermediate the edges of said member, first and second extendable means carried by said member on opposite sides thereof and disposed outwardly of the supporting surface of said member, said extendable means arranged to be extended beyond said surface of said member, and means on the underside of said trailer spaced apart to define stopping members for each of said extendable means and be engaged thereby to limit relative turning of the trailer with respect to the tractor.

2. The arrangement of claim 1 further including means for extending and retracting said extendable members from positions to engage stopping members.

3. The arrangement of claim 1 wherein housing means are attached to said plate-like member on opposite sides thereof with respect to the longitudinal center of the tractor, each of said housing means carrying one of said extendable means in the form of a cylindrical plunger, and fluid operated means in each of said housing means for extending and retracting said extendable means.

4. The arrangement of claim 1 wherein said stopping members on the underside of the trailer include resilient means to control the rate of application of forces when said extendable means engages said stopping members on the underside of the trailer.

5. The arrangement of claim 4 wherein said rate controlling means comprise springs which are initially engaged by said extendable means which transmit the forces of said extendable means to said stopping members.

6. In combination with a tractor and trailer where the trailer is partially supported on the surface of a plate-like member carried by said tractor and has a pivotal connection to the tractor intermediate the edges of said member, extendable means carried by said member on opposite sides thereof and arranged to be extended beyond said surface of said member, and means on the underside of said trailer spaced apart to define stopping members for said extendable means and be engaged thereby to limit relative turning of the trailer with respect to the tractor, said stopping members being positioned on said trailer to limit the angle with said tractor to no more, than 20°.

* * * * *

PO-1050
(5/69)

UNITED STATES PATENT OFFICE
CERTIFICATE OF CORRECTION

Patent No. 3,733,090            Dated May 15, 1973

Inventor(s) Anthony T. Keller

It is certified that error appears in the above-identified patent and that said Letters Patent are hereby corrected as shown below:

Column 1, line 41, "Ser. No. 39,062" should be -- Ser. No. 132,793 --. Line 43, delete "and now abandoned".

Signed and sealed this 5th day of March 1974.

(SEAL)
Attest:

EDWARD M. FLETCHER, JR.        C. MARSHALL DANN
Attesting Officer               Commissioner of Patents